United States Patent

Moran et al.

(10) Patent No.: US 10,356,242 B2
(45) Date of Patent: Jul. 16, 2019

(54) SYSTEM AND METHOD FOR MANAGING COMMUNICATION INTERRUPTS IN AN ENTERPRISE

(71) Applicant: Avaya Inc., Santa Clara, CA (US)

(72) Inventors: Thomas J. Moran, Galway (IE); Ronan Fox, Galway (IE); Neil O'Connor, Galway (IE); Paul D'Arcy, Galway (IE); Liam Loftus, Galway (IE)

(73) Assignee: Avaya Inc., Santa Clara, CA (US)

( * ) Notice: Subject to any disclaimer, the term of this patent is extended or adjusted under 35 U.S.C. 154(b) by 693 days.

(21) Appl. No.: 14/599,647

(22) Filed: Jan. 19, 2015

(65) Prior Publication Data

US 2016/0212264 A1 Jul. 21, 2016

(51) Int. Cl.
 *H04M 3/51* (2006.01)
 *H04M 3/22* (2006.01)
 *H04M 3/428* (2006.01)

(52) U.S. Cl.
 CPC ........ *H04M 3/5175* (2013.01); *H04M 3/2281* (2013.01); *H04M 3/4288* (2013.01); *H04M 2201/40* (2013.01)

(58) Field of Classification Search
 CPC ............. H04M 3/5175; H04M 3/2281; H04M 3/4288; H04M 2201/40
 USPC .................................................. 379/256.06
 See application file for complete search history.

(56) References Cited

U.S. PATENT DOCUMENTS

| | | | | |
|---|---|---|---|---|
| RE40,634 E | * | 2/2009 | Blair | G10L 17/26 |
| | | | | 370/436 |
| 8,416,943 B2 | * | 4/2013 | Baker | H04M 3/5232 |
| | | | | 379/265.01 |
| 8,634,537 B2 | * | 1/2014 | Hollatz | H04L 29/06027 |
| | | | | 370/352 |
| 2002/0059164 A1 | * | 5/2002 | Shtivelman | G06F 17/30722 |
| 2014/0025376 A1 | * | 1/2014 | Wasserblat | G10L 25/51 |
| | | | | 704/238 |
| 2014/0140497 A1 | * | 5/2014 | Ripa | H04M 3/5133 |
| | | | | 379/265.06 |

OTHER PUBLICATIONS

Internet Archive; Waybackmachine; http://office.microsoft.com/en-us/communicator-help/rules-HP001172553.aspx.

* cited by examiner

*Primary Examiner* — Ahmad F. Matar
*Assistant Examiner* — Jirapon Intavong

(57) ABSTRACT

A computing system for managing one or more communication interrupts during a communication session associated with a resource in an enterprise is disclosed. The computing system includes a monitoring module for monitoring one or more parameters of the communication session. The system further includes a database for storing the one or more monitored parameters. The system further includes a determination module for determining at least one participation score for the resource based on the one or more stored parameters. The system further includes a control module for controlling the one or more communication interrupts based on the at least one determined participation score.

20 Claims, 5 Drawing Sheets

SYSTEM AND METHOD FOR MANAGING COMMUNICATION INTERRUPTS IN AN ENTERPRISE

BACKGROUND

Field

Embodiments of the present invention generally relate to a system and method to manage communication sessions in an enterprise and particularly to a system and method for managing communication interrupts during a communication session.

Description of Related Art

Contact centers are employed by many enterprises to service, inbound and outbound contacts or customers. A primary objective of contact center management is to ultimately maximize contact center performance and profitability. An ongoing challenge in contact center administration is monitoring and optimizing contact center efficiency usage of its available resources. The contact center efficiency is generally measured by metrics such as Service Level Agreement ('SLA'), Customer Satisfaction ('CSAT'), and match rate. Contact center resources may include, agents, communication assets (e.g., number of voice trunks, number and bandwidth of video trunks, etc.), computing resources (e.g., a speed, a queue length, a storage space, etc.), and so forth.

Service level is one measurement of the contact center efficiency. Service level is typically determined by dividing the number of contacts accepted within a specified period by the number accepted plus number that were not accepted, but completed in some other way (e.g., abandoned, given busy, canceled, flowed out). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent in a queue over the same period. An agent with a primary skill level is one who typically may manage contacts of a certain nature more effectively and/or efficiently as compared to an agent of lesser skill level.

There are other contact center agents who may not be as proficient as the primary skill level agent, and those agents are identified either as skill level agents or backup skill level agents. As can be appreciated, contacts received by a primary skill level agent are typically managed more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ('KPIs'), such as revenue, estimated, actual, or predicted wait time, average speed of answer, throughput, agent utilization, agent performance, agent responsiveness and the like, to calculate performance relative to their Service Level Agreements ('SLAs'). Operational efficiency is achieved when the KPIs are managed near, but not above, SLA threshold levels.

Throughput is a measure of the number of contacts/contact requests or work requests that may be processed in a given amount of time. Agent utilization is a measure of how efficiently the agents' time is being used. Customer service level is a measure of the time customers spend waiting for their work to be managed. Company contact center customers wish to provide service to as many requests as possible in a given amount of time, using the least number of agents to do so, and minimizing the wait time for their customers that may increase the Service Level Agreement ('SLA') of the contact center. Further, the contact center may also have to maintain the Customer Satisfaction ('CSAT') metrics in order to maintain the KPIs of the contact center. For this purpose, agents may have to maintain the quality of services provided to the customers through multimedia (e.g., voice contacts, video contacts, emails, etc.).

In a multimedia conference environment, a resource can be contacted via multiple ways via, for example, a voice call, a video call, a text message, a web chat, and so forth. Also, a resource of the contact center can simultaneously work on more than one communication session such as a resource can manage a voice call and two emails simultaneously. While managing the communication session, the resource can be distracted when a communication interrupt is received. The communication interrupt can be a new incoming communication session from another customer of the contact center.

For example, a resource can receive a communication interrupt such as an Instant Messaging (IM) at a precise moment when the resource is already handling a video session of a customer. In another exemplary scenario, a resource is handling a conference voice session with multiple customers, and an Instant Messaging (IM) is received from one of the customers who can take the conference session into a different direction, which can further distract the resource while providing services to the customers of the conference communication session. In some cases, resources of the contact center may desire to be interruptible during a communication session but not at the precise moment when they are speaking.

In conventional techniques, resources can disable desktop applications that can potentially interrupt them while managing communication sessions. However, this may not be an ideal solution, as the resources may desire to receive communication interrupts while handling communication sessions when a frequency of communication during the communication session between a customer and the resource is less. Also, the resources may re-enable the desktop applications after completing communication sessions. However, these techniques require manual intervention of the resource and further, the resources forget to enable and/or disable the desktop applications. Also, audio interference can also be caused when a communication interrupt, such as an email, is received by a resource on a limited bandwidth network.

There is thus a need for a system and method for managing communication interrupts during a communication session in an enterprise in a more efficient manner.

SUMMARY

Embodiments in accordance with the present invention provide a computing system for managing one or more communication interrupts during a communication session associated with a resource in an enterprise. The computing system includes a monitoring module for monitoring one or more parameters of the communication session. The system further includes a database for storing the one or more monitored parameters. The system further includes a determination module for determining at least one participation score for the resource based on the one or more stored parameters. The system further includes a control module for controlling the one or more communication interrupts based on the at least one determined participation score.

Embodiments in accordance with the present invention further provide a computer-implemented method for managing one or more communication interrupts during a communication session associated with a resource in an enterprise. The method includes monitoring one or more parameters of the communication session; storing the one or more monitored parameters in one or more databases; determining at least one participation score for the resource based on the one or more stored parameters; and controlling the one or more communication interrupts based on the at least one determined participation score.

Embodiments in accordance with the present invention further provide a computer-implemented method for managing one or more communication interrupts during a communication session associated with a resource in an enterprise. The method includes monitoring one or more parameters of the communication session; storing the one or more monitored parameters in one or more databases; determining at least one participation score for the resource based on the one or more stored parameters; comparing the at least one participation score with a predefined threshold; and controlling the one or more communication interrupts based on the comparison between the at least one determined participation score and the predefined threshold.

Embodiments of the present invention may provide a number of advantages depending on its particular configuration. First, embodiments of the present application provide a system and a method for managing communication interrupts during a communication session in an enterprise such as, but not limited to, a contact center. Embodiments of the present application provide a mechanism to temporarily prevent interruptions, for example, visual interruptions such as an Instant Messaging (IM), audio interruptions such as voice sessions, and so forth, to a resource during a conference communication session. Next, embodiments of the present application provide a mechanism for delaying communication interrupts during a communication session until a resource is silent/not speaking for a certain period of time. This may further be useful in limited bandwidth environment. Also, embodiments of the present application may reduce sound or video interference that may occur while downloading an email.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
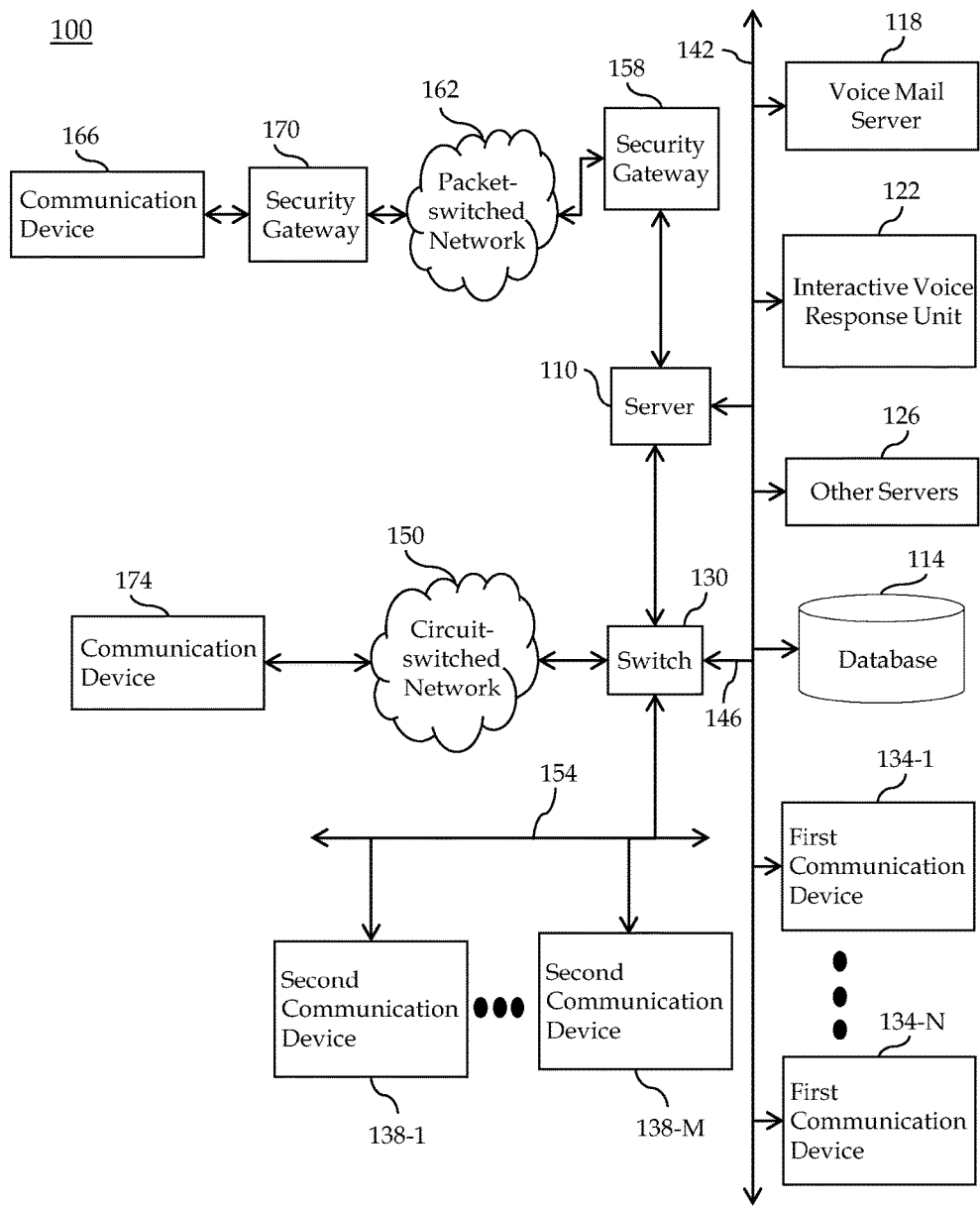
FIG. 1A illustrates a block diagram depicting a contact center, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

The terms "customer" and "contact" may be used interchangeably in certain context of this disclosure of the present invention when referring to one or more persons/entity contacting a contact center, usually to reach an IVR system and/or one or more agents for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

The term "resource" may be used interchangeably in certain context with "agent" within this disclosure of the present invention when referring to one or more persons/entity servicing a contact in a contact center or a knowledge resource within an enterprise servicing back office transactions. In an embodiment of the present invention, the resource may be, but is not restricted to, an agent, an available agent, a reserve agent, a trainee agent, a Subject Matter Expert (SME), a supervisor, and so forth.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1A shows an illustrative embodiment of the present invention. A contact center 100 comprises a server 110, a set of data stores or databases 114 containing contact or customer related information, resource related information and other information that may enhance the value and efficiency of the contact processing, and a plurality of servers, namely a voice mail server 118, an Interactive Voice Response unit (e.g., IVR) 122, and other servers 126, a switch 130, a plurality of working resources operating packet-switched (first) communication devices 134-1-N (such as computer work stations, or personal computers), where N is an integer, N≥1, and/or circuit-switched (second) communication devices 138-1-M where M is an integer, M≥1, all interconnected by a Local Area Network (LAN) 142, (or Wide Area Network (WAN)). In another embodiment of the present invention, the customer and resource related information may be replicated over multiple repositories.

The servers may be connected via optional communication lines 146 to the switch 130. As will be appreciated, the other servers 126 may also include a scanner (which is normally not connected to the switch 130 or Web Server), Voice over Internet Protocol (VoIP) software, video call software, voice messaging software, an Internet Protocol (IP) voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing communication sessions to one or more communication devices associated with resources of the contact center 100. In some embodiments of the present invention, the switch 130 may perform load-balancing functions by allocating incoming or outgoing communication sessions among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, Session Initiation Protocol (SIP) enabled Services™, Intelligent Presence Server™, and/or Avaya Interaction Center™, and any other products or solutions offered by Avaya, or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that embodiments of the present invention do not require any particular type of information transport medium between switch, or server and first and second communication devices, i.e., embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are SIP compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, customer communication devices, and other elements as shown in FIG. 1A is for purposes of illustration only and should not be construed as limiting embodiments of the present invention to any particular arrangement of elements.

Further, the server 110 is notified via the LAN 142 of an incoming communication session by the communications component (e.g., switch 130, a fax server, an email server, a web server, and/or other servers) receiving the incoming communication session as shown in FIG. 1A. The incoming communication session is held by the receiving telecommunications component until the server 110 forwards instructions to the component to forward or route the communication session to a specific contact center resource, such as the IVR unit 122, the voice mail server 118, and/or first or second telecommunication device 134-1-N, 138-1-M associated with a selected resource.

Figure 1B:
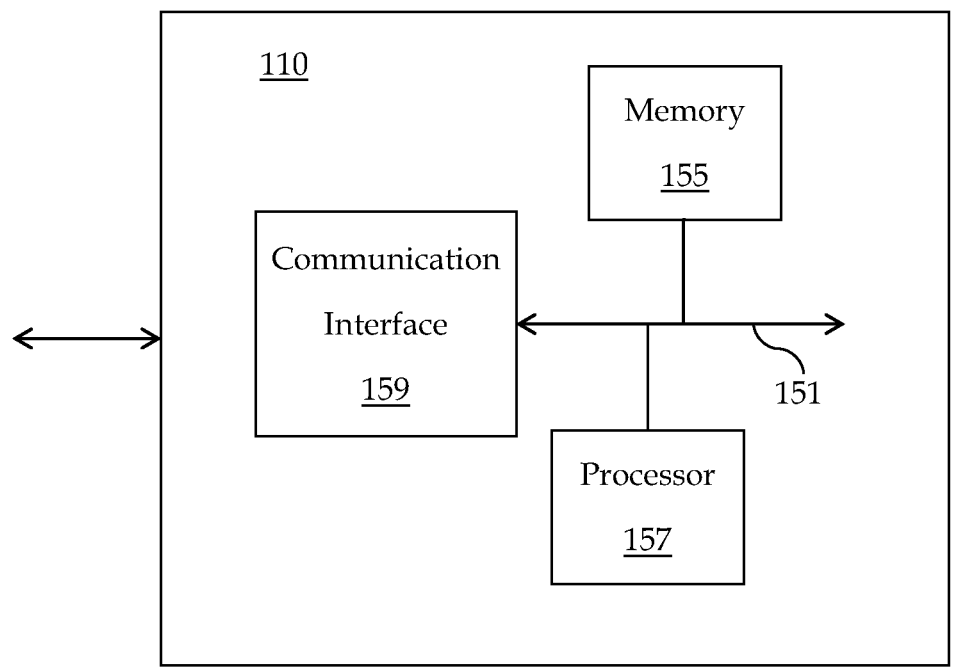
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may include, but not restricted to, an internal communication interface 151 that interconnects a processor 157, a memory 155, and a communication interface circuit 159. The communication interface circuit 159 may include, but not restricted to, a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end customers to access the services are described. The client side provides a customer with an interface for requesting services from the network, and the server side is responsible for accepting customer requests for services and providing the services transparent to the customer. By contrast in the peer-to-peer model or paradigm, each networked host runs both the client and server parts of an application program. Additionally, embodiments of the present invention do not require the presence of packet- or circuit-switched networks.

Figure 2:
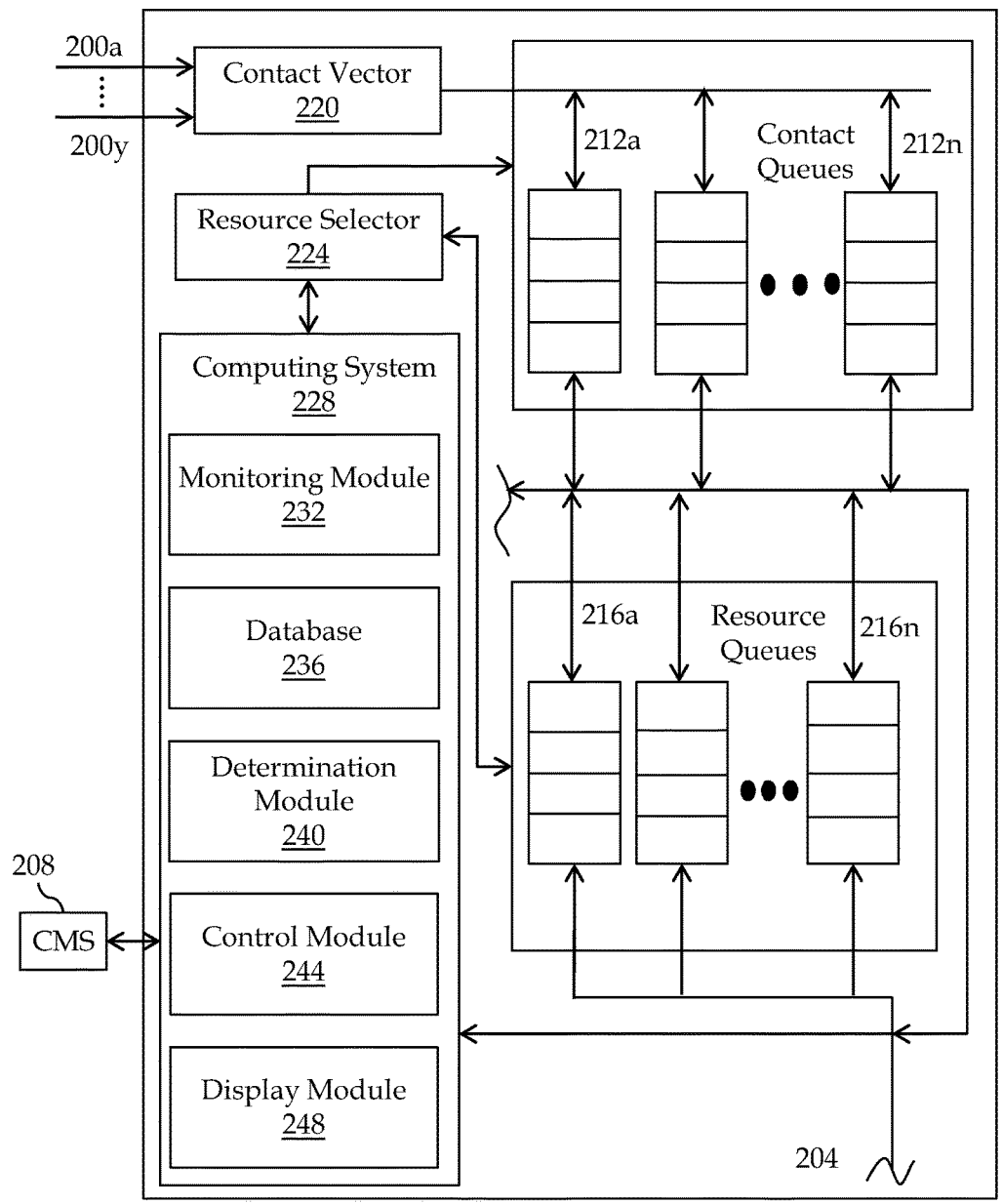
FIG. 2 illustrates a functional block diagram of the server that may be used in the contact center, according to an embodiment of the present invention.

Referring to FIG. 2, one possible configuration of the server 110 is depicted at a relatively high level of functional abstraction, according to an embodiment of the present invention. The server 110 is in communication with a plurality of contact or customer communication lines 200a-y (which may be one or more trunks, phone lines, etc.), and a resource communication line 204 (which may be a voice-and-data transmission line such as the LAN 142 and/or a circuit switched voice line). The server 110 may include, but not restricted to, Avaya Inc.'s Operational Analyst™ ('OA') with On-Line Analytical Processing ('OLAP') technology, or a Call Management System ('CMS') 208 that may gather records associated with customers of the contact center 100. OA and CMS will hereinafter be referred to jointly as CMS 208.

As shown in FIG. 2, among the data stored in the server 110 is a set of contact queues 212a-n and a separate set of resource queues 216a-n. Each contact queue 212a-n corresponds to a different set of resource queues, as does each resource queue 216a-n. Conventionally, contacts are prioritized and either are queued in individual ones of the contact queues 212a-n in their order of priority or are queued in different ones of a plurality of contact queues 212a-n that correspond to a different priority. Likewise, each of the resource's queues 216a-n are prioritized according to his or her level of expertise or skill in that queue, and resources are queued in either individual ones of resource queues 216a-n in their order of expertise level, or in different ones of a plurality of resource queues 216a-n that correspond to a queue and each one of which corresponds to a different expertise level. In an embodiment of the present invention, the resource queue 216a-n may include, but not restricted to, a set of reserve agents queue in the contact center 100.

According to an embodiment of the present invention, included among the control programs in the server 110 is a contact vector 220. Contacts or incoming communication sessions to the contact center 100 are assigned by the contact vector 220 to different contact queues 212a-n based upon a number of predetermined criteria, including a customer's identity, customer needs, contact center needs, current contact center queue lengths, a customer value, a resource's skill, and so forth, which is required for proper handling of the contact. Resources available for handling contacts are assigned to the resource queues 216a-n based upon the skills that they possess. A resource may have multiple skills, and hence may be assigned to multiple resource queues 216a-n simultaneously. Furthermore, a resource may have different levels of skill expertise (e.g., skill levels 1-N in one configuration or merely primary skill levels and secondary skill levels in another configuration), and hence may be assigned to different resource queues 216a-n at different expertise levels.

In one configuration, the contact center 100 is operated by a contact operator (e.g., a supervisor, or a manager of the contact center 100), and each of the contact queues 212a-n, and possibly each of the resource queues 216a-n, corresponds to a different client. Each client may have a separate Service Level Agreement (SLA) or other type of performance measurement agreement with the contact operator regarding performance expectations, goals, requirements or specifications for the contact's respective queue(s).

Further, embodiments in accordance with the present invention may include, among the programs executing on the server 110, a resource selector 224, and a computing system 228. The resource selector 224 and the computing system 228 are stored either in the main memory or in a peripheral memory (e.g., disk, CD ROM, etc.), or some other computer-readable medium of the contact center 100. Further, the resource selector 224 monitors the occupants of the contact and resource queues 212a-n and 216a-n, respectively, and contact center objectives, rules, and policies and select resources to service contacts.

The resource selector 224 distributes and connects these contacts to communication devices of resources based on the predetermined criteria noted above. When the resource selector 224 forwards a contact (or first work item) to a resource, the resource selector 224 also forwards customer-related information from the database 114 to the resource's desktop, or computer work station for previewing and/or viewing (such as by a pop-up display) to enable the resource for providing better services to the customer. Depending on the contact center configuration, the resource selector 224 may reallocate the contacts to the resources of the contact center 100. The resources process the contacts or work items sent to them by the resource selector 224.

In an embodiment of the present invention, the resource and their associated data are maintained and updated in the database 114 of the contact center 100. Upon the completion of handling a contact, a generator (not shown) collects selected metrics for the contact. These metrics may include skills involved in servicing the contact, an identifier of a servicing resource, contact duration, a transaction or contact type (e.g., sale, information request, complaint, etc.), time-of-day, result of the contact (e.g., type of sale, number of units sold, an average revenue generated, etc.), and so forth. The metrics along with other statistics is typically gathered by the CMS 208.

In an exemplary embodiment of the present invention, the computing system 228 is configured to monitor parameters of a communication session. In an embodiment of the present invention, the communication session may be a conference session that involves a plurality of resources. Further, the computing system 228 is configured to store the monitored parameters in a database. Further, the computing system 228 is configured to determine at least one participation score for the resource based on the stored parameters. Also, the computing system 228 is configured to control communication interrupts based on the determined participation score.

According to an embodiment of the present invention, the resource selection computing system 228 includes certain modules, such as, but is not restricted to, a monitoring module 232, a database 236, a determination module 240, a control module 244, and a display module 248. In some embodiments, one or more of the monitoring module 232, the database 236, the determination module 240, the control module 244, and the display module 248, may be implemented by one or more software processes running on the server 110. The server 110 may implement one or more software processes by use of the processor 157 being suitably programmed by use of software instructions stored in the memory 155 coupled to the processor 157.

The monitoring module 232 may monitor parameters associated with a communication session, according to an embodiment of the present invention. In an embodiment of the present invention, the monitoring module 232 may monitor a type of the communication session. The type of the communication session may include, but not restricted to, a voice session, a video session, a Short Message Service (SMS), a web chat, an Instant Messaging (IM), an email session, an Interactive Voice Response (IVR) session, a Voice over Internet Protocol (VoIP) session, and so forth. According to an embodiment of the present invention, the communication session may be a conference communication session that may have multimedia capabilities, for example, a resource managing multiple contacts on a conference session such as a voice session and a video session simultaneously. The monitoring module 232 may monitor static details associated with the communication session based on inputs selected by the customer in an Interactive Voice Response (IVR) menu of the contact center 100.

The monitoring module 232 may detect a pattern of energy level of a customer and/or resource during the communication session, according to an embodiment of the present invention. The energy level of the customer and/or resource during the communication session may be determined by monitoring frequency of conversation between the customer and the resource during the communication session, in an embodiment of the present invention. For example, in a communication session, a customer and a resource may talk continuously about a health policy. In another exemplary scenario, a communication session between a customer and a resource may include, but not restricted to, very short sentences such as, but not restricted to, yes or no answers, or may be small phrases such as, but not restricted to, yes, I will take an action, and so forth. In an embodiment of the present invention, the pattern of the energy level may include, but not restricted to, short sentences, long sentences, phrases, quick conversation, broader conversation, and so forth. In yet another exemplary scenario, an audio energy level of the customer and/or resource during the communication session may be detected by monitoring mouth movement of the customer and/or resource.

The monitoring module 232 may further determine context of the communication session by analyzing speech of the customer and/or resource, according to an embodiment of the present invention. In an embodiment of the present invention, a speech analyzer (not shown) may be used for speech related communication sessions, e.g., a voice session, to determine the context of the communication session. A text analyzer (not shown) may be used for text related communication sessions, e.g., a web chat, a text message, and the forth, to determine the context of the communication session. A video analyzer (not shown) may be used for video related communication sessions, e.g., a video session, to determine the context of the communication session. The monitoring module 232 may monitor past communication history of the customer and/or resource during the communication session, according to an embodiment of the present invention. In an exemplary scenario, if multiple question and answer conversation sequence occurs during a communication session, and a customer and/or resource stops conversing then there may be a possibility that they may resume the conversation in a short interval of time.

Furthermore, the monitoring module 232 may extract keywords from the communication session, according to an embodiment of the present invention. In an exemplary scenario, a customer may inquire about 'health insurance inquiry', then 'health insurance', and 'inquiry' may be extracted as keywords from the communication session.

The monitoring module 232 may monitor a type of the customer associated with the communication session, according to an embodiment of the present invention. In an exemplary scenario, a customer may be, but not restricted to, a platinum customer or a high priority customer, a gold customer or a medium priority customer, and/or a silver customer or a low priority customer. A customer having higher revenue products and/or services provided by the contact center 100 may be referred as a high priority customer. A customer having medium revenue products and/or services provided by the contact center 100 may be referred as a medium priority customer. Further, a customer having low revenue products and/or services provided by the contact center 100, or may be a potential customer of the contact center 100 may be referred as a low priority customer. In an embodiment of the present invention, the resource of the contact center 100 may have the capability to simultaneously manage multiple communication sessions having different media types. In an exemplary scenario, a resource may manage a voice session and two web chat sessions at a same time.

In an embodiment of the present invention, the parameters of the communication session may be monitored in a real time environment. The parameters of the communication session may include, but not restricted to, a type of communication session, static details, pattern of energy level of a customer and/or resource, context of the communication session, audio-content of the current conversation, past conversation/communication history, and so forth, according to an embodiment of the present invention.

The database 236 may store the monitored parameters of the communication session, according to an embodiment of the present invention. The database 236 may be an internal database of the contact center 100, in an embodiment of the present invention. In another embodiment of the present invention, the database 236 may be the database 114 of the contact center 100. The database 236 may be a third-party hosted database, according to yet another embodiment of the present invention. In an embodiment, the database 236 may be an in-memory database.

The determination module 240 may assign weights to the stored parameters associated with the communication session, according to an embodiment of the present invention. In an exemplary scenario, a resource 'A' may converse with a customer by using short sentences then a weight such as 'two' may be assigned to the resource 'A', whereas, a resource 'B' may be having a quick conversation with a customer then a weight such as 'six' may be assigned to the resource 'B'.

Further, the determination module 240 may determine a participation score for the resource associated with the communication session, according to an embodiment of the present invention. In an embodiment of the present invention, the participation score may define an active participation of a resource with a customer during a communication session. The participation score may define whether the resource may be capable of managing another communication session simultaneously while managing the current communication session, in another embodiment of the present invention. In another embodiment of the present invention, the participation score may define whether the resource is so involved in the communication session that they should not even be distracted by the presentation of a new communication session.

The determination module 240 may determine the participation score based on the stored parameters of the communication session, in an embodiment of the present invention. In an exemplary scenario, a resource 'A' may be continuously conversing with a high priority customer associated with a communication session about a car insurance policy, then a high participation score such as 'seven' may be determined for the resource 'A'. In another exemplary scenario, a resource 'B' may be conversing with a low priority customer in short sentences on an IM then a low participation score such as 'three' may be determined for the resource 'B'.

Further, the determination module 240 may determine the participation score based on a predefined set of rules, according to an embodiment of the present invention. The predefined set of rules may include, but not restricted to, smoothing techniques, business strategies, business processes, and so forth, of the contact center 100, in an embodiment of the present invention. For example, the smoothing techniques may refer to, but not limited to, techniques for dealing with a customer, or managing masking interrupts etc. In an exemplary scenario, the business strategy may be, but not restricted to, a work selection strategy, a resource selection strategy, and so forth. Furthermore, the determination module 240 may compare the determined participation score with a predefined threshold, according to an embodiment of the present invention.

The control module 244 may control communication interrupts based on the comparison of the determined participation score with the predefined threshold, according to an embodiment of the present invention. The communication interrupt may be an incoming communication session from another customer of the contact center 100, in an embodiment of the present invention. The type of the communication interrupt may include, but not restricted to, a voice session, a video session, a Short Message Service (SMS), a web chat, an Instant Messaging (IM), an email session, an Interactive Voice Response (IVR) session, a Voice over Internet Protocol (VoIP) session, and so forth. The control module 244 may block an interruption via a communication interrupt in the communication session associated with the resource when the determined participation score may be above than the predefined threshold, in an embodiment of the present invention. In another embodiment of the present invention, the control module 244 may unblock an interruption via a communication interrupt during the communication session associated with the resource when the determined participation score may be less than the predefined threshold. In an embodiment of the present invention, the control module 244 may utilize the predefined set of rules, for example, smoothing techniques, in order to prevent the interruption during the communication session. In another embodiment of the present invention, the control module 244 may utilize hysteresis, for example, the determined participation score along with the past history of the communication session between the customer and the resource, in order to prevent the interruption during the communication session.

In an exemplary scenario, the control module 244 may temporarily prevent an audio interruption such as, but not restricted to, a voice session, on another communication line during the communication session. In another exemplary scenario, the control module 244 may temporarily prevent an audio interruption such as, but not restricted to, a voice session, on another communication line, in addition to a visual interruption during the communication session.

The control module 244 may resume delivery of the communication interrupts to the resource during the communication session when it may be determined that the determined participation score may be less than the predefined threshold, according to an embodiment of the present invention. In an embodiment of the present invention, the control module 244 may dynamically block/unblock delivery of the communication interrupts to the resource during the communication session. Further, the control module 244 may enable the supervisor of the contact center 100 to manually override the capability on an interrupt blocker, in another embodiment of the present invention. Further, the control module 244 may have the ability to retain capability to interrupt the resource based on, but not restricted to, a reporting hierarchy, a location, an email domain, and so forth.

The display module 248 may display indicators during the communication session on the resource's desktop when blocking/unblocking of the communication interrupts may be in effect, according to an embodiment of the present invention. The indication may include, but not restricted to, a visual indication, an audio indication, a graphical icon, and so forth, in an embodiment of the present invention.

Figure 3:
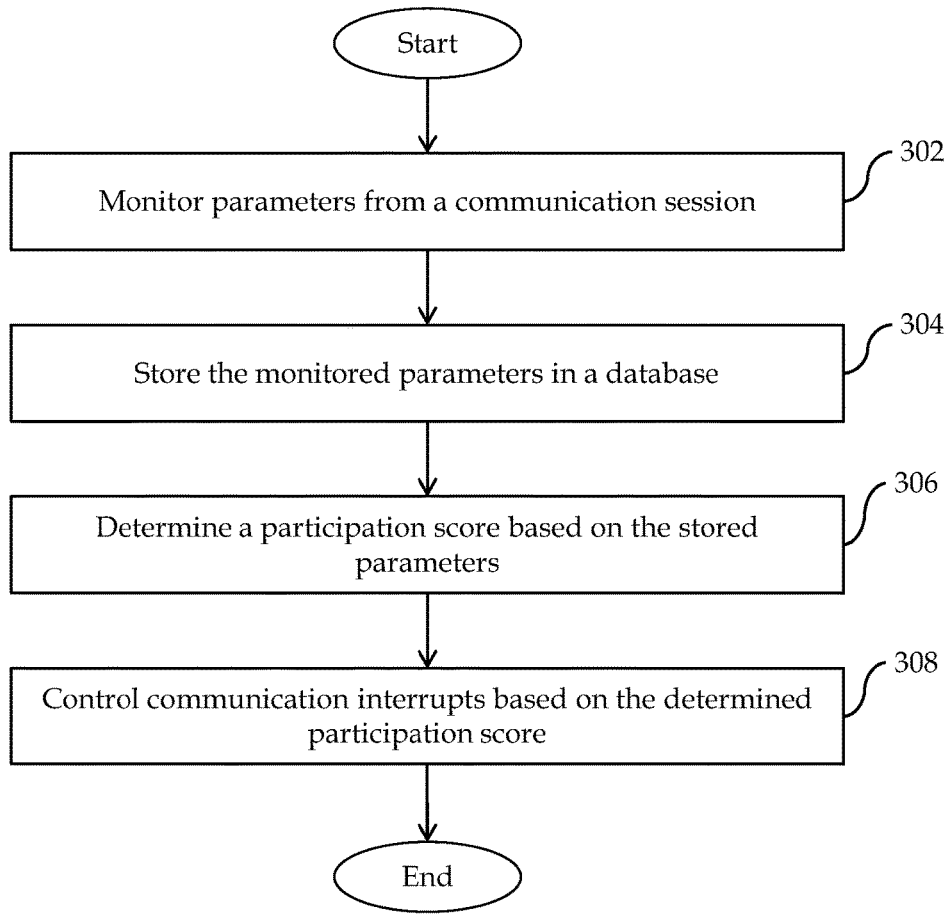
FIG. 3 depicts a flowchart of a method for managing communication interrupts during a communication session, according to an embodiment of the present invention.

FIG. 3 depicts a flowchart of a method 300 for managing communication interrupts during a communication session, according to an embodiment of the present invention. At step 302, the computing system 228 monitors parameters associated with the communication session, according to an embodiment of the present invention. In an embodiment of the present invention, the computing system 228 monitors a type of the communication session such as, but not restricted to, a voice session, a video session, a Short Message Service (SMS), a web chat, an Instant Messaging (IM), an email session, an Interactive Voice Response (IVR) session, a Voice over Internet Protocol (VoIP) session, and so forth. Further, the computing system 228 monitors static details associated with the communication session by monitoring inputs selected by a customer in an IVR menu of the contact center 100, according to an embodiment of the present invention.

The computing system 228 detects a pattern of energy level of a customer and/or resource during the communication session, according to an embodiment of the present invention. The energy level of the customer and/or resource during the communication session may be determined by monitoring frequency of conversation between the customer and the resource during the communication session, in an embodiment of the present invention. Further, the computing system 228 determines context of the communication session by analyzing speech of the customer and/or resource, according to an embodiment of the present invention. Furthermore, the computing system 228 extracts keywords from the monitored parameters of the communication session, according to an embodiment of the present invention. Also, the computing system 228 determines a type of the customer associated with the communication session, according to an embodiment of the present invention. In an exemplary scenario, a customer may be, but is not restricted to, a platinum customer, a gold customer, and/or a silver customer.

At step 304, the computing system 228 stores the monitored parameters in a database, according to an embodiment of the present invention. In an embodiment of the present invention the database may be an internal database of the contact center 100, an external database, an in-memory database, or a third party hosted server.

Next, at step 306, the computing system 228 computes a participation score for the resource associated with the communication session based on the stored parameters, according to an embodiment of the present invention. In an embodiment of the present invention, the participation score may define an active participation of a resource with a customer during a communication session. The participation score may define whether the resource may be capable of managing another communication session simultaneously while managing the current communication session, in another embodiment of the present invention.

The computing system 228 computes the participation score for the communication session based on a predefined set of rules, according to another embodiment of the present invention. The computing system 228 computes the participation score based on pre-stored statistical parameters, according to another embodiment of the present invention. In an embodiment of the present invention, the participation score may be related to the participants such as, but not limited to, the resource.

Thereafter, at step 308, the computing system 228 controls the communication interrupts during the communication session based on the comparison between the determined participation score and the predefined threshold, according to an embodiment of the present invention. The communication interrupt may be an incoming communication session from another customer of the contact center 100, in an embodiment of the present invention. The type of the communication interrupt may include, but not restricted to, a voice session, a video session, a Short Message Service (SMS), a web chat, an Instant Messaging (IM), an email session, an Interactive Voice Response (IVR) session, a Voice over Internet Protocol (VoIP) session, and so forth. The computing system 228 prevents an interruption via a communication interrupt during the communication session associated with the resource when the determined participation score may be above than the predefined threshold, in an embodiment of the present invention. In another embodiment of the present invention, the computing system 228 unblocks an interruption via a communication interrupt during the communication session associated with the resource when the determined participation score may be less than the predefined threshold.

Figure 4:
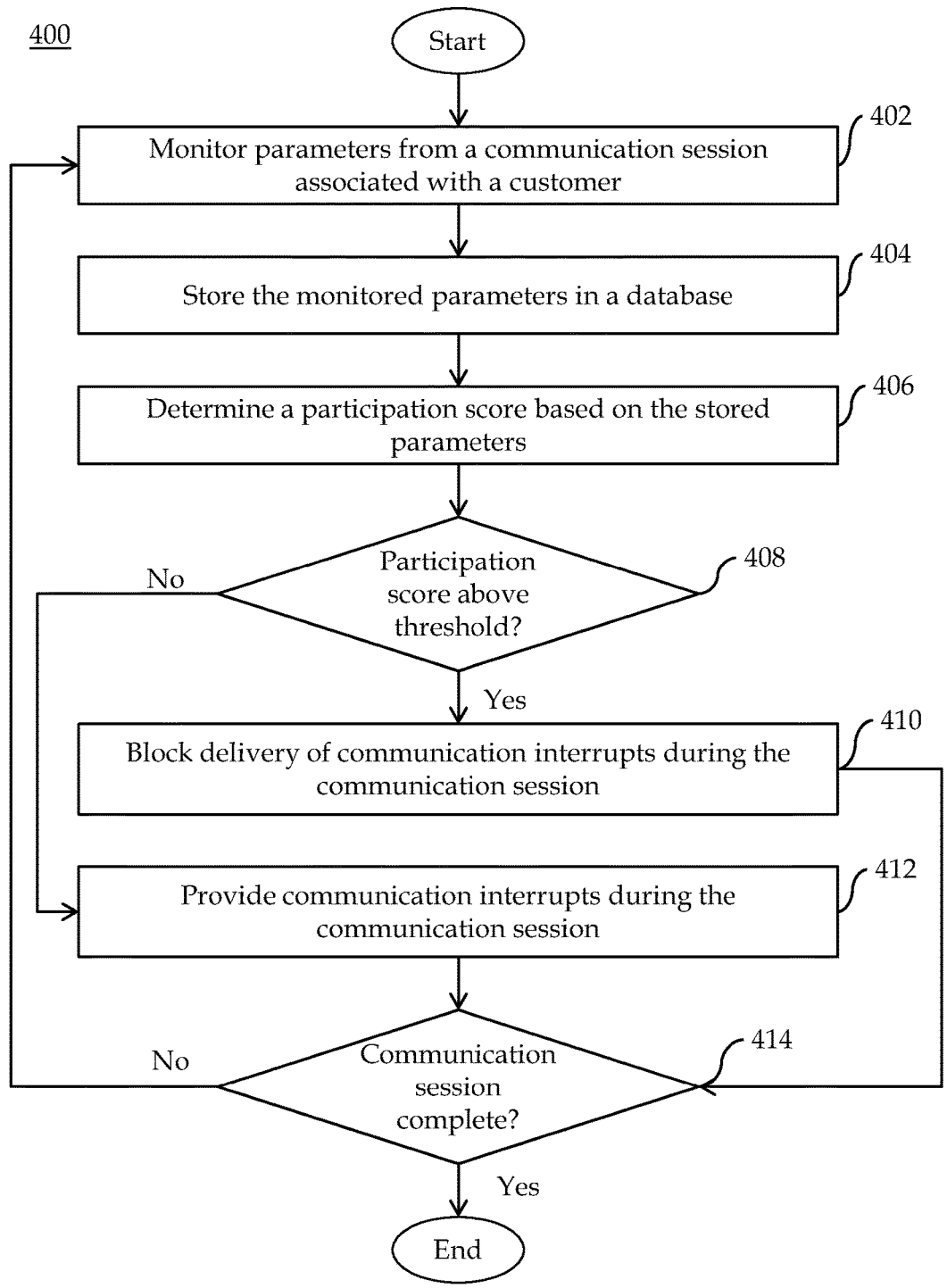
FIG. 4 depicts a flowchart of a method for managing communication interrupts during a communication session, according to an embodiment of the present invention.

FIG. 4 depicts a flowchart of a method 400 for managing communication interrupts during a communication session, according to an embodiment of the present invention. At step 402, the computing system 228 monitors parameters associated with the communication session, according to an embodiment of the present invention. In an embodiment of the present invention, the computing system 228 monitors a type of the communication session such as, but not restricted to, a voice session, a video session, a Short Message Service (SMS), a web chat, an Instant Messaging (IM), an email session, an Interactive Voice Response (IVR) session, a Voice over Internet Protocol (VoIP) session, and so forth. Further, the resource selection computing system 228 monitors static details of the communication session by monitoring inputs selected by a customer associated with the communication session, in an IVR menu of the contact center 100, according to an embodiment of the present invention.

The computing system 228 detects a pattern of energy level of a customer and/or resource during the communication session, according to an embodiment of the present invention. The energy level of the customer and/or resource during the communication session may be determined by monitoring frequency of conversation between the customer and the resource during the communication session, in an embodiment of the present invention. Further, the computing system 228 determines context of the communication session by analyzing speech of the customer and/or resource, according to an embodiment of the present invention. Furthermore, the computing system 228 extracts keywords from the monitored parameters of the communication session, according to an embodiment of the present invention. Also, the computing system 228 determines a type of the customer associated with the communication session. In an exemplary scenario, a customer may be, but not restricted to, a platinum customer, a gold customer, and/or a silver customer.

At step 404, the computing system 228 stores the monitored parameters in a database, according to an embodiment of the present invention. In an embodiment of the present invention, the database may be an internal database of the contact center 100. The database may be an external database, an in-memory database, or a third party hosted server, in another embodiment of the present invention.

Next, at step 406, the computing system 228 computes a participation score for the resource associated with the communication session based on the stored parameters, according to an embodiment of the present invention. In an embodiment of the present invention, the participation score may define an active participation of a resource with a customer during a communication session. The participation score may define whether the resource may be capable of managing another communication session simultaneously while managing the current communication session, in another embodiment of the present invention. The computing system 228 computes the participation score for the communication session based on a predefined set of rules, according to another embodiment of the present invention. The computing system 228 computes the participation score based on pre-stored statistical parameters, according to yet another embodiment of the present invention.

At step 408, the computing system 228 determines whether the determined participation score is above a predefined threshold or not, according to an embodiment of the present invention. If it is determined that the determined participation score is above a predefined threshold then the method 400 proceeds towards step 410. Otherwise, the method 400 proceeds towards step 412.

Thereafter, at step 410, the computing system 228 blocks delivery of a communication interrupt to the resource during the communication session, according to an embodiment of the present invention. In an exemplary scenario, a resource may be currently managing a voice session and a communication interrupt such as an email may be received by the contact center 100 then an assignment of the email to the resource may be prevented during the communication session.

At step 412, the computing system 228 provides a communication interrupt to the resource during the communication session, according to an embodiment of the present invention. In an exemplary scenario, a resource may be currently managing an email session and a communication interrupt such as a video session, may be received by the contact center 100 then the video session may be assigned to the resource during the communication session.

Further, at the step 414, the computing system 228 determines whether the communication session is complete or not. If it is determined that the communication session is not complete, then the method 400 returns to the step 402. If it is determined that the communication session is complete, then the method 400 concludes.

In an embodiment of the present invention, the present invention may be implemented in paired devices associated with a resource. In an exemplary scenario, a mobile device associated with a resource may be paired with a phone in an enterprise, such as, but not restricted to, a contact center. A customer of the enterprise may contact the resource on the enterprise's phone but the resource may not be able to pick up the contact then the contact may automatically rolls over to the mobile device associated with the resource. Further, another customer who may try to contact the resource on the mobile device while the resource may be managing a communication session on the enterprise's phone then the contact of another customer may be suppressed on the mobile device during the communication session.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computation efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A server for managing a communication interrupt during a communication session in an enterprise, the server comprising a processor and a memory, wherein the processor uses programming code stored in the memory to:
   monitor one or more parameters of the communication session, wherein the communication session is associated with a contact of the enterprise and a resource in the enterprise; wherein to monitor one or more parameters comprises the processor further using the programming code to detect a pattern of energy level of the contact and the resource by monitoring a frequency of conversation between the contact and the resource during the communication session and monitoring a length of sentences of the resource;
   store the one or more monitored parameters;

determine at least one participation score for the resource based on the one or more stored parameters, wherein the participation score defines whether the resource is capable of managing a communication interrupt comprising another communication session simultaneously while managing the current communication session; and assign another communication session involving another contact of the enterprise to the resource when the participation score defines that the resource can manage another communication session.

2. The server of claim 1, wherein the processor is further configured to use programming code to extract keywords from the one or more monitored parameters of the communication session.

3. The server of claim 1, wherein the processor is further configured to use programming code to monitor the one or more parameters of the communication session in a real time environment.

4. The server of claim 1, wherein the processor is further configured to use programming code to assign weight to the one or more stored parameters.

5. The server of claim 1, wherein the processor is further configured to use programming code to determine the at least one participation score based on a predefined set of rules.

6. The server of claim 5, wherein the predefined set of rules comprises business processes, or business strategies.

7. The server of claim 1, wherein the processor is further configured to use programming code to compare the at least one participation score with a predefined threshold.

8. The server of claim 7, wherein the processor is further configured to use programming code to assign the communication interrupt based on the comparison between the at least one determined participation score and the predefined threshold.

9. The server of claim 1, wherein the processor is further configured to use programming code to dynamically control the communication interrupt.

10. A processor-implemented method for managing a communication interrupt during a communication session in an enterprise, the method comprising:

monitoring, by a processor of the enterprise, one or more parameters of the communication session, wherein the communication session is associated with a contact of the enterprise and a resource in the enterprise; wherein to monitor one or more parameters comprises to detect a pattern of energy level of the contact and the resource by the processor monitoring a frequency of conversation between the contact and the resource during the communication session and monitoring a length of sentences of the resource;

storing, by the processor, the one or more monitored parameters in one or more databases;

determining, by the processor, at least one participation score for the resource based on the one or more stored parameters, wherein the participation score defines whether the resource is capable of managing a communication interrupt comprising another communication session simultaneously while managing the current communication session; and assigning, by the processor, another communication session to the resource when the participation score defines that the resource can manage another communication session.

11. The method of claim 10, further comprising extracting, by the processor, keywords from the one or more monitored parameters of the communication session.

12. The method of claim 10, further comprising monitoring, by the processor, the one or more parameters of the communication session in a real time environment.

13. The method of claim 10, further comprising assigning, by the processor, weight to the one or more stored parameters.

14. The method of claim 10, further comprising determining, by the processor, the at least one participation score based on a predefined set of rules.

15. The method of claim 14, further comprising comparing, by the processor, the at least one participation score with a predefined threshold.

16. The method of claim 15, further comprising controlling, by the processor, the communication interrupt based on the comparison between the at least one determined participation score and the predefined threshold.

17. The method of claim 10, further comprising causing, by the processor, display of at least one indicator during the communication session.

18. A processor-implemented method for managing a communication interrupt during a communication session in an enterprise, the method comprising:

monitoring, by a processor of the enterprise, one or more parameters of the communication session, wherein the communication session is associated with a contact of the enterprise and a resource in the enterprise; wherein to monitor one or more parameters comprises to detect a pattern of energy level of the contact and the resource by the processor monitoring a frequency of conversation between the contact and the resource during the communication session and monitoring a length of sentences of the resource;

storing, by the processor, the one or more monitored parameters in one or more databases;

determining, by the processor, at least one participation score for the resource based on the one or more stored parameters, wherein the participation score defines whether the resource is capable of managing a communication interrupt comprising another communication session simultaneously while managing the current communication session;

blocking the communication interrupt to the resource when the participation score defines that the resource cannot manage another communication session; and unblocking the communication interrupt to the resource when the participation score defines that the resource can manage another communication session.

19. The method of claim 18, further comprising causing, by the processor, at least one indicator to be displayed during the communication session.

20. The method of claim 18, wherein the communication session is a conference session that involves a plurality of resources.

* * * * *